United States Patent

[11] 3,597,654

[72] Inventors Glen E. Harland, Jr.;
 Charles G. Hanson, both of Kokomo, Ind.
[21] Appl. No. 858,029
[22] Filed Sept. 15, 1969
[45] Patented Aug. 3, 1971
[73] Assignee General Motors Corporation
 Detroit, Mich.

[54] PROTECTIVE CIRCUIT FOR A VOLTAGE REGULATOR
 12 Claims, 6 Drawing Figs.

[52] U.S. Cl. ............................................... 317/13 B,
 317/20, 317/41, 322/28, 322/36, 320/64
[51] Int. Cl. ............................................... H02h 3/14,
 H02h 9/04
[50] Field of Search ................................. 317/13, 20,
 31, 40; 320/39, 40, 61, 64; 322/28, 36, 73

[56] References Cited
 UNITED STATES PATENTS
 3,467,854  9/1969  Harland et al. ............... 322/32 (X)
 3,469,168  9/1969  Harland et al. ............... 317/31 (X)
 3,491,285  1/1970  Nowakowski ................. 322/28 X

*Primary Examiner* — J. D. Miller
*Assistant Examiner* — Harvey Fendelman
*Attorneys* — E. W. Christen, C. R. Meland and Richard G. Stahr ABSTRACT: A protective circuit for a semiconductor voltage regulator of the transistor type which is used to control the output voltage of a generator. The regulator is adapted to regulate the output voltage of a diode-rectified alternating current generator that is used to supply the electrical loads on a motor vehicle. The generating system includes auxiliary diodes for feeding the field winding of the generator under the control of a switching transistor device which forms a part of the voltage regulator. The protective circuit regulates the output voltage of the generator at a value which is higher than the desired regulated voltage in the event that a disconnection occurs in the system which would otherwise cause a destructive high voltage output from the generator. This protective circuit includes a voltage divider formed in part by a temperature sensitive resistance. The voltage divider is coupled to a semiconductor such as a forward biased diode or a transistor and when the voltage applied to the field circuit of the generator rises to a predetermined value the protective circuit operates to control the output transistor stage of the voltage regulator to limit the output voltage of the generator to a value which is higher than its normal operating value but which is low enough to prevent destruction of the semiconductor components of the voltage regulator.

INVENTORS
Glen E. Harland, Jr. &
Charles G. Hanson
BY
C. R. Meland
ATTORNEY

PROTECTIVE CIRCUIT FOR A VOLTAGE REGULATOR

This invention relates to a protection circuit for semiconductor voltage regulators of the type used in electrical systems disclosed in our U.S. Pat. application Ser. No. 668,836, filed on Sept. 19, 1967 and now Pat. No. 3,469,168, granted on Sept. 23, 1969.

In battery charging systems of the type disclosed in the above-mentioned Pat. application Ser. No. 668,836 now Pat. No. 3,469,168 a diode rectified alternating current generator is utilized to supply charging current to a battery and supply other electrical loads found on a motor vehicle. The rectifier system includes a bridge rectifier that feeds load conductors and also includes auxiliary or field energizing diodes which are connected with the field winding through a transistor switching device which forms a part of the voltage regulator. The voltage regulator includes a voltage sensing circuit for sensing the voltage at the battery and operates to maintain the output voltage of the generator at a substantially constant value, for example, 14 volts in a 12 volt vehicle electrical system.

In the type of regulator shown in the above-mentioned Pat. application Ser. No. 668,836 now Pat. No. 3,469,168, the output transistor stage is turned fully on whenever the sensed voltage of the generator is below the desired regulated value. It has been discovered, as mentioned in the prior application now Pat. No. 3,469,168, that should the voltage sensing circuit become disconnected from the battery or should the battery become disconnected from the bridge rectifier, the sensing circuit attempts to apply full field current to the generator with the result that the output voltage may rise to a point where it destroys some of the semiconductor components of the voltage regulator. In the above-mentioned Pat. No. 3,469,168 a voltage protection circuit, which includes a Zener diode, was provided connected to the auxiliary diodes which operated to limit the output voltage of the generator to a value higher than the desired regulated value should the voltage sensing circuit attempt to apply full field to the generator due to a disconnection or other malfunction in the system.

Although the voltage protection circuit of the above-mentioned Pat. No. 3,469,168 is satisfactory for performing the over voltage function it includes a filter circuit which had a capacitor which operates to integrate the voltage input waveform and prevent the high gain switching amplifier from triggering on a false signal. It is desirable to manufacture the voltage regulator as an integrated circuit in order to provide small size and other advantages and in fabricating integrated circuits it is further desirable to eliminate the use of capacitors.

It accordingly is one of the objects of this invention to provide a voltage protection circuit for a voltage regulator of the type that has been described that does not require a capacitive filter circuit and yet which is operative to properly regulate the output voltage of the generator in the event of a disconnection or malfunction of the system. In carrying this object forward a voltage divider is provided which senses the voltage applied across the field circuit of the generator and the ratios of resistance of the voltage divider is made high so that transient variations of input voltage to the voltage divider are substantially reduced to prevent false triggering of the voltage protection circuit. A junction of the voltage divider impedance is coupled to a semiconductor such as a transistor or a forward biased PN junction diode which then operates to regulate the switching of the output transistor of the voltage regulator when an over voltage condition exists.

One leg of the voltage divider comprises an impedance which may take various configurations but which is sensitive to the operating temperature of the voltage regulator. This impedance therefore compensates for the changes in temperature characteristics of the semiconductors forming the voltage protection circuit so that the protective circuit operates properly under all temperature conditions.

It accordingly is another object of this invention to provide a voltage protection circuit which is capable of operating over a wide temperature range and is capable of properly protecting the system during the over voltage condition. This is accomplished by correlating the resistance change of the voltage divider with the change in junction voltage characteristics of the semiconductor due to temperature variations to thereby achieve a stable protective level over a temperature range without sacrificing the advantages of a high voltage divider ratio.

Still another object of this invention is to provide a voltage protection circuit for a voltage regulator which is fabricated as an integrated circuit and to provide such an arrangement wherein the semiconductor components have a common collector connection to provide for ease of manufacture.

Figure 1:
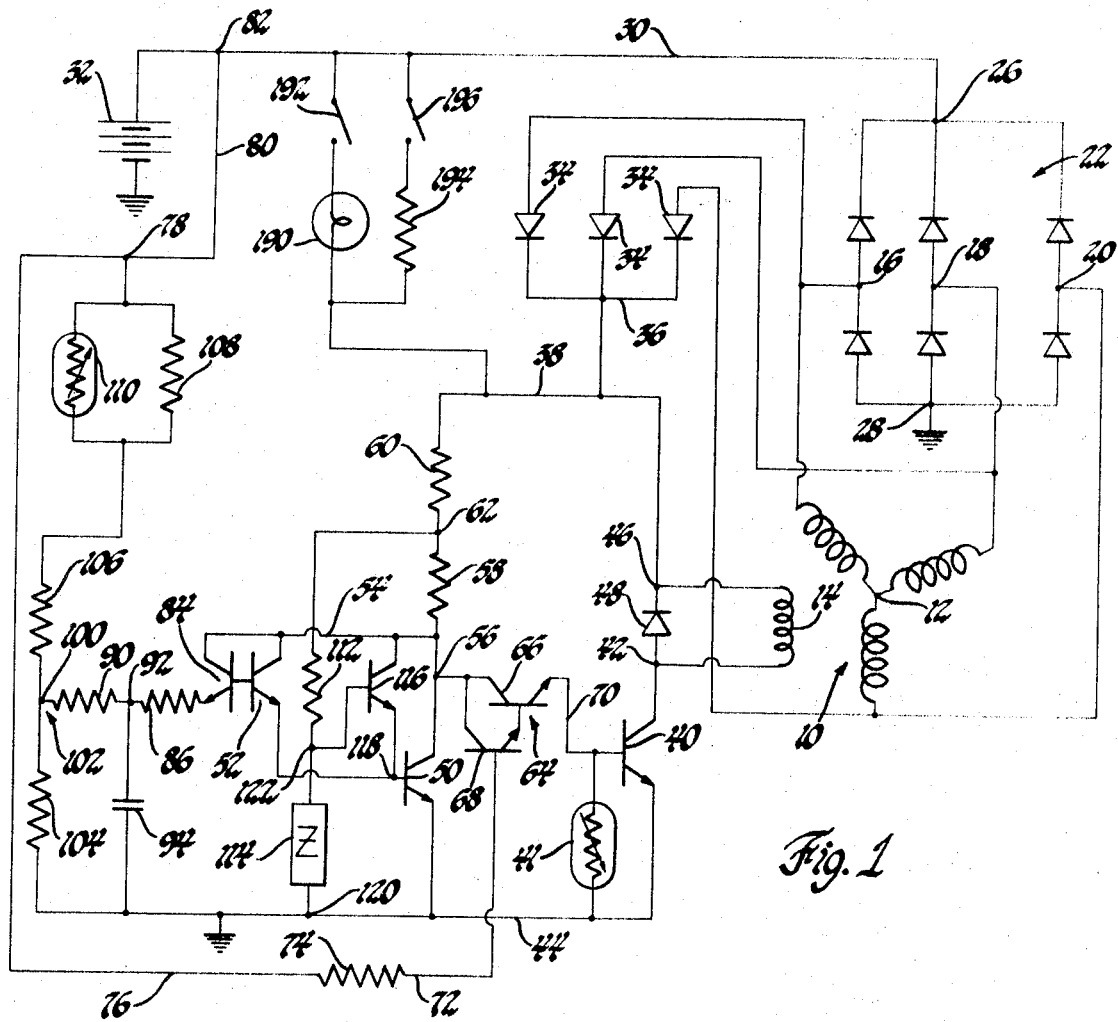
FIG. 1 is a schematic circuit diagram of an electrical system which has a semiconductor voltage regulator provided with the voltage protection circuit of this invention.

Referring now to the drawings and more particularly to FIG. 1, an electrical system for a motor vehicle is illustrated wherein the reference numeral 10 designates an alternating current generator having a three-phase Y-connected output winding 12 and a field winding 14. The phase windings of the output winding 12 are connected with the AC input terminals 16, 18 and 20 of a three-phase full-wave bridge rectifier 22. The bridge rectifier 22 is preferably formed of six silicon diodes and has a positive direct current output terminal 26 and a negative direct current output terminal 28 that is connected to ground. The direct current output terminal 26 is connected with a power supply conductor 30 which in turn is connected to the positive side of a battery 32. The battery in a motor vehicle system is a storage battery and is charged by the generator 10 during operation of the motor vehicle. The generator 10 is driven by the engine of the vehicle at varying speeds. The conductor 30 is utilized in a motor vehicle electrical system to supply other electrical loads which are not illustrated.

The electrical system of FIG. 1 further includes three auxiliary silicon diodes 34 having their anodes connected respectively with the phase windings of the generator and having their cathodes commonly connected to a conductor 36. The conductor 36 is connected with a conductor 38 which forms a direct current field energizing terminal. It will be appreciated by those skilled in the art that when the generator 12 is developing an output voltage direct current will be applied between conductor 38 and ground by a bridge rectifier circuit which includes the diodes 34 and the three lower diodes of bridge rectifier 22 having their anodes connected to the grounded direct current output terminal 28. The conductor 38 and ground can therefore be termed direct current field energizing terminals since the field 14 is connected across these terminals or conductors.

The electrical system includes a semiconductor voltage regulator which has an output transistor 40. Transistor 40 is an NPN transistor having its collector connected with junction 42 and its emitter connected to grounded conductor 44. The junction 42 is connected to one side of the field winding 14, the opposite side of the field connected with junction 46 which in turn is connected to the field energizing terminal or conductor 38. A diode 48 is connected across the field 14 and operates as a field discharge diode in a manner well known to those skilled in the art.

Figure 3:
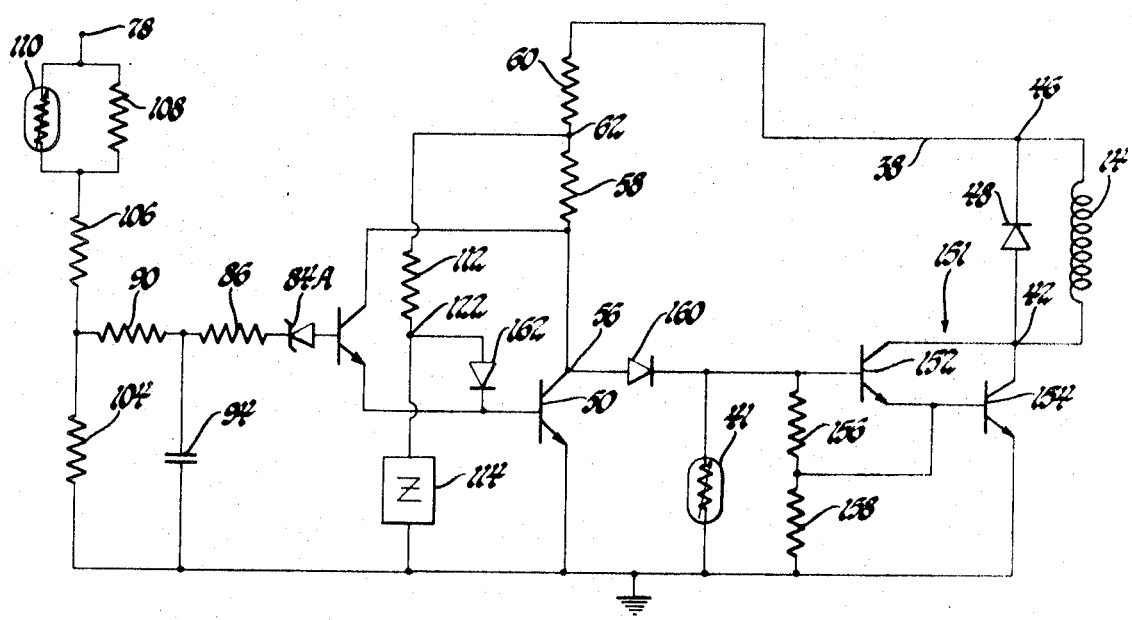
FIG. 3 is a modification of the system illustrated in FIG. 1 and also illustrating some of the semiconductor components as discrete circuit elements.

It now will be appreciated that field current can be supplied to the field winding 14 from conductor 36, through conductor 38, through field winding 14, through the collector-emitter circuit of transistor 40 when it is turned on to conductor 44 and then back to the grounded diodes of bridge rectifier 22 through the grounded connections of direct current terminal 28 and grounded conductor 44. Although the output transistor 40 has been illustrated as a single transistor it may take the form of a Darlington amplifier as shown in FIG. 3.

The switching of transistor 40 is controlled by a driver transistor switching stage comprised of NPN transistors 50 and 52 which form a Darlington amplifier and which have a common collector connection designated by reference numeral 54. The collector of transistor 50 is connected with a junction 56 which in turn is connected to direct current conductor 38 through resistors 58 and 60 which have a junction 62. The junction 56 is connected with the base of transistor 40 through a Darlington amplifier generally designated by reference numeral 64 comprised of NPN transistors 66 and 68. The connection between junction 56 and the base of transistor 40 also includes the conductor 70. The Darlington amplifier 64 forms a semiconductor switch which connects the junction 56 and the base of transistor 40 when this Darlington amplifier is forward biased. The bias on the transistor switch 64 is controlled by the conductor 72 connected with the base of transistor 68. It is seen that the conductor 72 is connected in series with a current limiting resistor 74 which in turn is connected in series with conductor 76. The conductor 76 is connected with junction 78 which in turn is connected with a voltage sensing lead 80. The lead 80 forms the voltage sensing lead for the voltage regulator and is connected to junction 82 closely adjacent the positive side of the battery 32 to thereby sense the voltage appearing between junction 82 and ground or in other words the voltage applied to the battery from the generator. On a motor vehicle the junction 82 is located as close as possible to the positive terminal of the battery so as to accurately sense battery voltage.

The transistor switch 64 provides a protective feature for the voltage regulator since it only connects the driver stage of the voltage regulator and the output transistor 40 when lead 80 is connected to junction 82. Should the lead 80 become disconnected from junction 82 the transistor switch 64 would be nonconductive to thereby prevent base drive to the transistor 40 with the result that the generator would not develop an output voltage. Were it not for this protection circuit and should the lead 80 become disconnected from junction 82 the output voltage of the generator would rise to a point where it might damage the battery 32 by overcharging the battery. The circuit, including transistor 64, operates in conjunction with the voltage protection system of this invention in a manner to be described hereinafter. This voltage protection system, including transistor switch 64, is disclosed and claimed in our copending Pat. application Ser. No. 770,047, filed on Oct. 23, 1968 which is now Pat. No. 3,539,864, granted on Nov. 10, 1970.

It should be pointed out that where it is not desired to utilize the voltage protection circuit, which includes transistor switch 64, a diode can be coupled between junction 56 and the base of transistor 40 in a manner illustrated in FIG. 3 and to be described hereinafter.

The switching of the Darlington amplifier, comprised of transistors 50 and 52, is controlled as a function of the output voltage of the generating system appearing between junction 82 and ground. To this end it is seen that the base of transistor 52 is connected with the base of transistor 54 having a common collector connection with transistor 52 and having an emitter connected with resistor 86. The emitter-base junction of transistor 54 actually provides a Zener diode connected between one end of resistor 86 and the base of transistor 52. This component is illustrated as Zener diode 84A in the FIG. 3 embodiment it being understood that the emitter-base junction of transistor 84 provides the Zener diode.

The resistor 86 is connected with a resistor 90 at junction 92 and a filter capacitor 94 is connected between junction 92 and grounded conductor 44. The resistor 90 is connected with a junction 100 on a voltage sensing circuit generally designated by reference numeral 102. This voltage sensing circuit is comprised of resistors 104 and 106 and the parallel combination of resistor 108 and thermistor 110 connected in series with resistors 106 and 104. The voltage at junction 100 is a function of the voltage appearing between junction 82 and ground and therefore is an indication of the output voltage of the generator which is to be regulated. The thermistor 110 has a negative temperature coefficient of resistance and provides temperature compensation for the system.

The voltage protection circuit of this invention comprises the resistors 58 and 60, resistor 112, impedance 114 and semiconductor 116 which takes the form of an NPN transistor having a common collector connection with the other transistors of the system. The emitter of transistor 116 is connected with junction 118 and therefore to the base of transistor 50. The resistor 112 and the impedance 114 are connected in series between junctions 62 and 120 and have a common junction 122 connected with the base of transistor 116.

Figure 2:
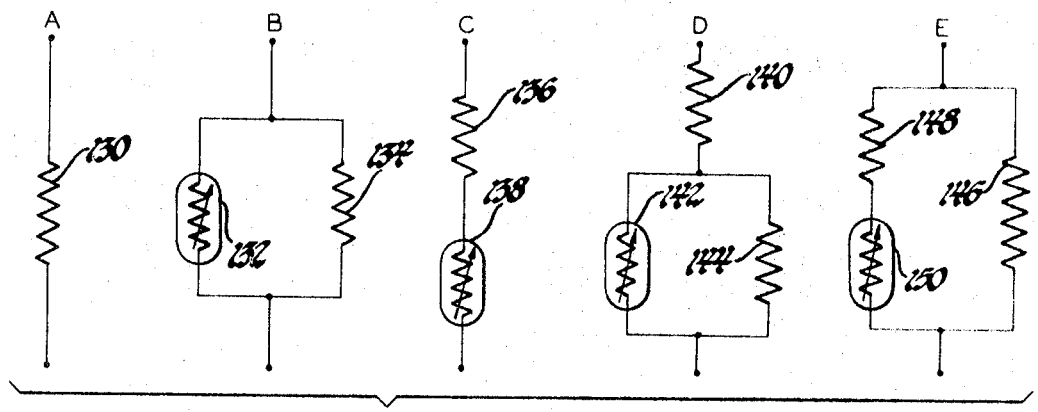
FIG. 2 illustrates five circuit configurations which can be utilized to form an impedance for one of the parts of the voltage protection system of this invention.

The impedance 114 can take various configurations as illustrated in FIG. 2 where five circuit configurations 2A through 2E are illustrated. In FIG. 2A the impedance 114 is a resistor designated by reference numeral 130. In FIG. 2B the impedance 114 is provided by a thermistor 132 having a negative temperature coefficient of resistance connected in parallel with a resistor 134. In FIG. 2C the impedance 114 is a resistor 136 connected in series with a thermistor 138 having a negative temperature coefficient of resistance. In FIG. 2D the impedance 114 takes the form of a resistor 140 connected in series with a parallel combination of thermistor 142 and resistor 144 while in FIG. 2E the impedance 114 is provided by a resistor 146 connected in parallel with the series combination of resistor 148 and thermistor 150. In FIGS. 2D and 2E the thermistors have a negative temperature coefficient of resistance. The preferred form of the impedance 114 is the FIG. 2B arrangement.

Disregarding for now the function of the voltage protection circuit of this invention the normal regulating mode for the voltage regulator will now be described it being understood that the voltage regulator is to hold the voltage appearing between junction 82 and ground at a desired regulated value, for example, 14 volts in a 12 volt system. Assuming that the voltage between junction 82 and ground is higher than the desired regulated voltage the voltage divider 102 is arranged such that the potential between junction 100 and ground is effective to bias the Darlington amplifier comprised of transistors 52 and 50 to a conductive condition. During this condition the voltage between junction 100 and ground will be high enough to break down the Zener diode provided between emitter and base of transistor 84 and the forward biased diodes provided by the base-emitter circuits of transistors 52 and 50. When transistor 50 conducts the voltage at junction 56 will be lowered to a point where it will not forward bias the base-emitter circuit of transistor 40 with the result that transistor 40 switches off interrupting field current. In regard to the bias of the base-emitter circuit of transistor 40 there is some voltage drop across the collector-emitter of the Darlington amplifier 64 which reduces the potential at the base of transistor 40 when junction 56 is at its low potential value. The base-emitter circuit of transistor 40 is shunted by a thermistor 41 having a negative temperature coefficient of resistance and this thermistor improves the temperature stability of the output stage of the voltage regulator by reducing the base drive to the base-emitter circuit of the output transistor as temperature increases.

When field current is interrupted the output voltage of the generator decreases with the result that the voltage at junction 82 decreases. When this voltage drops to a predetermined value the circuit, including the Zener diode and the base-emitter junctions of transistors 52 and 50 will no longer be forward biased with the result that transistor 50 switches substantially to a nonconductive condition. This raises the potential of junction 56 with the result that transistor 40 is now biased conductive.

The regulator therefore operates to switch the transistor 40 on and off to maintain the desired regulated voltage. It should be pointed out that the regulator is arranged such that with no voltage or a voltage lower than the desired regulated value applied to voltage sensing circuit 102 the transistor 40 is biased conductive.

The function of the voltage protection circuit of FIG. 1 is to regulate the output voltage of the generator in the event that the voltage sensing circuit 102 senses either no voltage or battery voltage. If lead 80, for some reason, becomes disconnected from junction 82 the voltage sensing circuit would sense no voltage with the result that output transistor 40 would be biased continuously on to raise the output voltage to a point where it would destroy certain of the components of the voltage regulator. Where the transistor switch 64 is utilized the disconnection of conductor 80 would of course remove the base drive to output transistor 40 to thereby prevent the generator voltage from going out of control by essentially deenergizing the generator field. On the other hand, should conductor 30 become disconnected from junction 26 the voltage sensing circuit 102 would sense battery voltage and since this is lower than the desired regulated charging voltage the field again would be continuously energized with the result that the output voltage would go out of control and destroy components of the system. As explained in our copending Pat. application Ser. No. 770,047, filed on Oct. 23, 1968 now Pat. No. 3,539,864, the disconnection of the lead 80, without provision of the transistor switch 64, could result in damaging the battery whereas the disconnection of lead 30 and junction 26 would not cause this problem because the battery and bridge rectifier are then disconnected. Voltage protection is still required however in order to protect the components of the voltage regulator and the diodes 34.

Assuming now that the voltage sensing circuit tends to bias the transistor 40 full on the voltage between conductor 38 and ground rises but is limited to a higher regulated value by the voltage protection system of this invention. The voltage protection system will maintain an output voltage of, for example, 19 to 30 volts, preferably 19 volts between conductor 38 and ground when an over voltage condition exists. This of course provides a higher voltage between terminal 26 and ground than the desired regulated voltage because the voltage between terminal 26 and ground increases and decreases with changes in voltage between junction 38 and ground since both the power and field circuits are fed from the same output winding. The voltage at junction 26 does not control the regulator since it is assumed that conductor 30 is disconnected from junction 26 to cause the over voltage condition.

It can be seen that should the voltage between conductor 38 and ground increase the voltage at junction 122 likewise increases and at some point, namely the level at which the voltage protection circuit is to operate, the transistor 50 will be biased conductive thereby lowering the potential of junction 56 to turn off transistor 40. The turning on of transistor 50 depends upon the break down voltage of the base-emitter circuits of transistors 116 and 50. In other words, when the potential between junction 122 and ground exceeds the break down voltage of the base-emitter circuits of transistors 116 and 50 the transistor 50 will be biased on with the result that transistor 40 is turned off. The base-emitter circuits of transistors 116 and 50 therefore operate as a voltage reference device and the voltage of junction 122 of course varies depending upon the voltage between conductor 38 and ground. When transistor 40 turns off the output voltage of the generator decreases causing transistor 50 to be biased nonconductive and biasing transistor 40 back on. It therefore is seen that the voltage protection circuit will limit the output voltage to some value higher than the desired regulated value but not so high as to cause component destruction by causing transistor 40 to switch on and off.

The voltage divider, comprised of resistor 112 and impedance 114, is arranged so that the voltage protection circuit will not be sensitive to transient variations appearing between junction 62 and ground. The voltage $V_{122}$, appearing between junction 122 and ground, can be expressed as $$V_{122} = \frac{Z}{R+Z} V_{62}$$

where $Z$ equals the resistance of impedance 114, $R$ equals the resistance of resistor 112 and $V_{62}$ equals the voltage appearing between junction 62 and ground. By making the resistance of resistor 112 a relatively high value compared to the resistance of the impedance 114 it can be seen that the voltage at junction 122 is substantially reduced in magnitude as compared to the voltage at junction 162. As an example, if the resistance of resistor 112 is 9,000 ohms and the resistance of impedance 114 approximately 300 ohms the voltage at junction 122 will be approximately equal to 1/31 the potential appearing at junction 62. It therefore can be seen that the magnitude of potential at junction 122 varies a comparatively minor amount compared to any change in voltage at junction 62 with the result that a filter capacitor is not required for proper operation of the voltage protection circuit.

It is important that the impedance 114 have a resistance which varies with temperature changes of the voltage regulator to compensate for the changes in the temperature dependent break down voltages of the junctions of the silicon semiconductors that make up the voltage regulator. As an example, the potential required to break down the base-emitter circuit of transistor 116 may be approximately 0.7 volts at 25° C. and 0.5 volts at 125° C. In order that the voltage protection circuit will operate at the same voltage regardless of temperature it is necessary that the resistance of impedance 114 decrease to provide less voltage across the base-emitter circuits of transistors 116 and 50 as temperature increases. As previously mentioned, FIG. 2A through 2E illustrates several configurations for providing the impedance 114. In FIG. 2A a resistor which should be of a type having a negative temperature coefficient of resistance is illustrated and this impedance arrangement would be the least effective in regard to temperature stabilization since its resistance would vary the least wit changes in temperature.

It can be seen that with the arrangement in FIG. 2B the effective resistance of impedance 114 will be reduced as temperature increases since the thermistor 132 has a negative temperature coefficient of resistance. In FIG. 2C the same result will be obtained by the series connection of the negative temperature coefficient of resistance thermistor 138 and the series connected resistor 136. FIGS 2D and 2E illustrate further circuit arrangements wherein the thermistors 142 and 150 have a negative temperature coefficient of resistance and operate to reduce the effective resistance of impedance 114 as temperature increases. In all of the arrangements that have been described the resistors have selected values to provide the decrease in effective resistance of the impedance 114 as temperature increases.

It is pointed out that the elements comprising the impedance arrangements of the voltage regulator shown in FIG. 2 are preferably mounted on a substrate supporting the integrated circuit containing the semiconductor components so that these elements such as the thermistors, are subjected to substantially the same temperature as the junctions of the semiconductors.

Referring now to FIG. 3 a modified voltage regulating system is illustrated which can be used to control the energization of the field winding of the generator 10 in the system of FIG. 1. For purposes of simplification the generator and battery have not been illustrated and similar parts in FIGS 1 and 2 have been identified by the same reference numeral.

In FIG. 3 it is seen that the field controlling device rather than taking the form of a transistor 40 now takes the form of a Darlington amplifier 151 comprised of NPN transistors 152 and 154 connected with resistors 156 and 158. The thermistor 41 is connected across the base and emitter of the Darlington amplifier or in other words between the base of transistor 152 and the emitter of transistor 154. In FIG. 3 the protective circuit, including Darlington amplifier switch 64, has been eliminated and a diode 160 is utilized in place of the amplifier 64. In FIG. 3 a diode 162 is connected between the junction 122 and the base of the NPN transistor 50. This diode is a silicon diode and has the same forward characteristics as the PN junction formed by the base-emitter circuit of transistor 116. When the voltage at junction 122 reaches the protective level the transistor 50 is switched conductive to therefore turn off the output transistors 152 and 154. The remainder of the circuit of FIG. 3 is identical with its counterpart in FIG. 1 with the exception that Zener diode 84A is illustrated as a discrete component and this is provided, as explained before, by the emitter-base junction of transistor 84. It is of course to be understood that FIG. 1 need not be modified to the extent of the modification shown in FIG. 3. As an example, the FIG. 1 system can be used with a Darlington output stage for transistor 40 but without the other modifications shown in FIG. 3.

Figure 4:
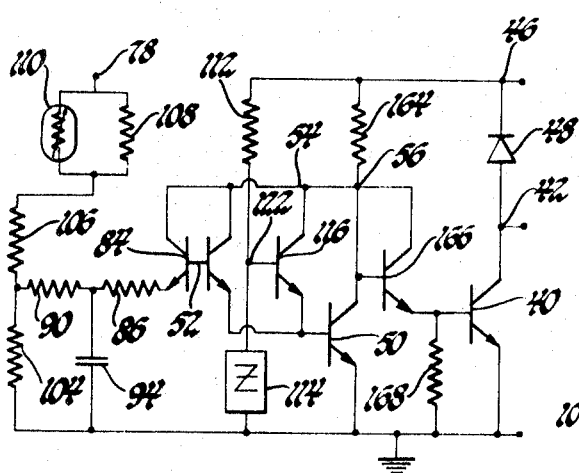
FIGS. 4, 5 and 6 are schematic circuit diagrams of modified voltage protection circuits which can be used in the system of FIG. 1.

Referring now more particularly to FIG. 4, a modification of a part of the system shown in FIG. 1 is illustrated and again the same components in each system have been identified by the same reference numeral. In FIG. 4 the resistors 60 and 58 of FIG. 1 have been replaced by a single resistor 164 and the transistor protection switch 64 has been replaced by a forward biased diode. This forward biased diode is provided by the base-emitter junction of NPN transistor 166 having its collector connected to its base. With this arrangement the base-emitter circuit of transistor 166 forms a forward biased PN junction to therefore provide a diode of the same type as designated by reference numeral 160 in FIG. 3. In addition, the FIG. 4 system utilizes a resistor 168 in place of the thermistor 41. The FIG. 4 embodiment operates in the same manner as the FIG. 1 embodiment in that when the potential at junction 122 reaches the protective level the transistor 50 is switched on with the result that the output transistor 40 is switched off. The impedance 114 in FIG. 4 again can take the configurations illustrated in FIG. 2 and preferably is of the type shown in FIG. 2B.

Figure 5:
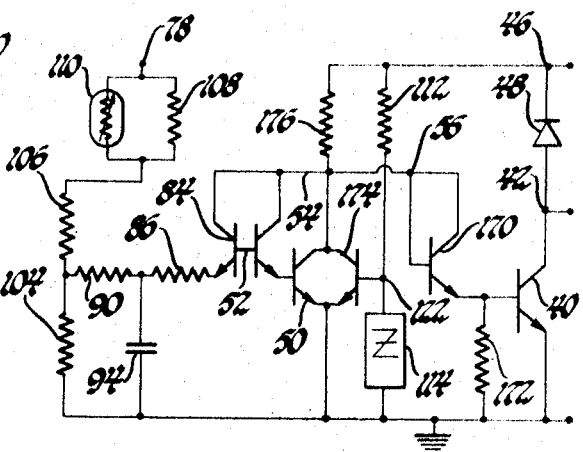

Fig. 5 is another modification of the system shown in FIG. 1 and again the same reference numerals have been used in FIG. 5 to identify the same parts in FIGS. 1 and 5. In FIG. 5 a forward biased diode provided by the base-emitter junction of NPN transistor 170 is utilized and a resistor 172 is used instead of the thermistor 41. In FIG. 5 an NPN transistor 174 is provided which has its collector connected to the collector of the driver transistor 50. The emitter of transistor 174 is connected to the emitter of transistor 50 and to conductor 44 while the base of transistor 174 is connected with junction 122 between impedance 114 and resistor 112 that performs the same voltage dividing function in FIG. 5 that they did in FIG. 1. When the voltage at junction 122, in FIG. 5, reaches the protective level, that is, the level where the voltage on conductor 38 is in the 19 to 30-volt range, the base-emitter circuit of transistor 174 is forward biased turning on the transistor 174 in its collector-emitter circuit. This lowers the voltage of junction 56 to the point where output transistor 40 will be switched off with the result that field current reduces. As the voltage now decreases transistor 40 switches back on. The net result of this is that the voltage protection circuit will regulate the voltage at a higher than the desired regulated value as it does in the other embodiments of this invention. In FIG. 5 a single resistor 176 replaces the resistors 58 and 60 used in FIG. 1.

Figure 6:
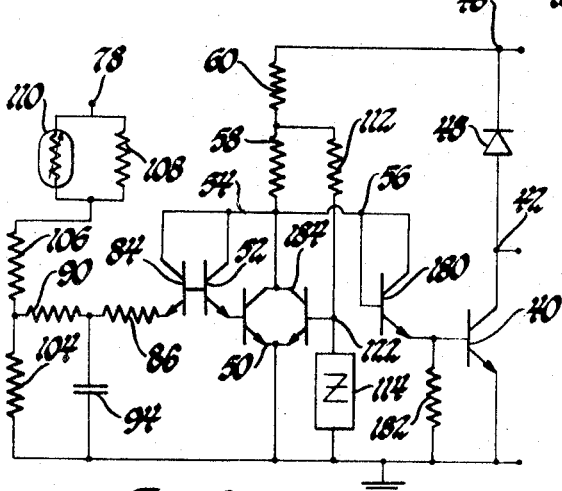

FIG. 6 is another modified version of a part of the system illustrated in FIG. 1 utilizing a forward biased diode provided by the base-emitter junction of NPN transistor 180 and a resistor 182 instead of thermistor 41. The system of FIG. 6 utilizes a transistor 184 connected the same as transistor 174 of FIG. 5 and utilizes the same resistor arrangement 58, 60 and 112 as that shown in FIG. 1. The voltage protection circuit of FIG. 6 operates in the same manner as that shown in FIG. 5 in that when the voltage at junction 122 reaches the protection level the transistor 184 is forward biased thereby reducing the voltage at junction 56 to turn off output transistor 40. Transistor 40 is switched back on whenever the level of the voltage drops to a predetermined value and the protection circuit then regulates the voltage at this higher than the desired regulated voltage.

In summarizing the various embodiments of this invention it will be appreciated that the voltage protection circuit of this invention can take various forms as long as a voltage divider is provided having the described resistance ratio and a leg which varies its resistance as a function of temperature. In the embodiment disclosed in the drawings the temperature dependent impedance 114 is in the lower leg of the voltage divider. It should be pointed out, however, that the temperature sensitive impedance could be in the upper leg of the voltage divider and the fixed resistor in the lower leg. For example, the impedance 114 could be a resistor of a fixed value and impedance 112 would then be comprised of a temperature dependent component or components having a positive temperature coefficient of resistance. With such an arrangement the voltage appearing between junction 122 and conductor 44 would decrease as the temperature of the voltage regulator increased to provide the same temperature stabilization that is provided by impedance 114 in its position illustrated in the drawing. It is important in designing this voltage divider that the resistance of resistor 112 be substantially higher than the resistance of impedance 114 regardless of the temperature sensitive arrangement that is used in order that no filter capacitor be required for the voltage protection circuit.

It will be appreciated by those skilled in the art that the use of the transistor switch 64 is optional in the various embodiments of the invention and a forward biased diode could be substituted for this switch as illustrated in the embodiments of FIGS. 3 through 6. Conversely, the transistor switch 64 can be used in the embodiments of FIGS. 3 through 6 instead of the forward biased diode. Moreover, the voltage protection circuit of this invention can be used where the output transistor is a single transistor such as shown in FIG. 1 or where it takes the form of a Darlington amplifier 151 comprised of transistors 152 and 154 as shown in FIG. 3. It therefore is seen that many modifications and combinations disclosed herein can be used together and still provide a voltage protection circuit which operates under varying temperatures and which does not require a filter capacitor.

It is preferred that the voltage regulator be fabricated as an integrated circuit to provide small size for the regulator and improved reliability. In FIG. 1 semiconductors 84, 52, 116, 50, 68 and 66 are formed as a single integrated circuit having a common N-type collector and form a driver or input chip for the regulator. Output transistor 40 is formed as a separate semiconductor and may take the form of a Darlington amplifier as shown in FIG. 3 which is formed on a common N-type material.

As previously pointed out, one of the important features of this invention is the use of a voltage divider comprised of impedances 112 and 114 having a high voltage divider ratio. The ratio of resistances between resistors 112 and 114 in the embodiment described hereinbefore is approximately 30 to 1, that is, the resistance of resistor 112 has 30 times as much resistance as the resistance of impedance 114. It is also important that the voltage reference device, when using such a resistance ratio, utilize forward biased PN junction as compared to a Zener diode which was utilized in the voltage protection circuit of above-mentioned Pat. application Ser. No. 668,836 now Pat. No. 3,469,168. Thus, the use of the high voltage divider resistance ratio is compatible with the use of forward biased diodes as voltage reference devices since forward biased diodes require less voltage to break them down in a forward direction as compared to Zener diodes. As an example, in the Pat. application Ser. No. 668,836 now Pat. No. 3,469,168 the Zener diode may have a breakdown voltage of approximately 9 volts which would not permit the use of a high voltage divider ratio as used in the present invention. By comparison, the base-emitter circuits of transistors 116 and 50 shown in FIG. 1 only require approximately 1.5 volts in a forward direction to cause forward conduction of the PN junctions and therefore a turning on of transistor 50. The high voltage divider ratio of approximately 30 to 1 prevents the system from switching on transient voltages without utilizing a capacitor but still provides the voltage protection required in the type of system that has been described.

It has been pointed out that the voltage protection circuit operates at some voltage which is higher than the desired regulated voltage to be maintained between junction 82 and ground. To summarize this operation and assuming a 12-volt system the voltage regulator will, under normal operating conditions, maintain approximately 14 volts between junction 82 and ground. Under these conditions the voltage between conductor 38 and ground will be closely approximate the voltage between junction 82 and ground. Should the voltage now rise to somewhere in the 19 to 30 volt range due to a disconnection in the system the voltage protection circuit will be brought into operation to regulate the output voltage at a higher value but not so high as to destroy the semiconductor components of the voltage regulator.

The electrical system of this invention may include a charge indicator lamp which will indicate a malfunction in the system. To this end a signal lamp 190 is connected between conductor 38 and an ignition switch 192. The ignition switch 192 is connected between conductor 30 and the signal lamp 190. A resistor 194 and an accessory switch 196 are provided connected in series with each other and in parallel with the signal lamp 190 and ignition switch 192.

It will be appreciated that when switches 192 and 196 are closed the signal lamp 190 will be energized but will be turned off when the generator develops an output voltage since at this time the voltage of conductor 38 will approach the voltage of conductor 30 to turn off the signal lamp 190. The reason for connecting the signal lamp 190 and the resistor 194 respectively to the ignition and accessory switches is to prevent feedback into the ignition system as is explained in detail in the U.S. Pat. to Colvill 3,244,900. If the system is to be used with an ammeter the signal lamp circuit that has been described need not be utilized.

When utilizing the embodiments of this invention disclosed in FIGS. 5 and 6 a pair of transistors connected in a Darlington configuration, like Darlington amplifier 64 of FIG. 1, can be used in place of either transistor 174 or 184. In such an arrangement the base of the Darlington transistor would be connected to junction 122, the common collector to the collector of transistor 50 and the emitter to the emitter of transistor 50.

What we claim is:

1. An electrical system comprising, a generator having an output winding an a field winding, a field energizing circuit connected with said output winding including first and second direct current field energizing terminals, a voltage regulator including input and output transistor means, each transistor means comprising at least one transistor, means connecting said field winding and said output transistor means in series across said field energizing terminals whereby field current is controlled by said output transistor means, means connecting the collector and emitter of said input transistor means across the base and emitter of said output transistor means whereby said input transistor means controls the conduction of said output transistor means, means including a voltage reference device connecting said input transistor means with said output winding whereby the conduction of said output transistor means is controlled to maintain a desired regulated output voltage for said generator, a voltage divider including first and second impedances connected across said field energizing terminals, said voltage divider including a junction connected between said impedances the voltage of which varies depending upon the output voltage of said generator, one of said impedances including a temperature dependent resistance which responds to the temperature of said voltage regulator, and a voltage responsive semiconductor including a PN junction having a predetermined forward breakdown voltage connected between said voltage divider junction and one of said field energizing terminals having a lower potential than said junction, said semiconductor connected with said input transistor means and operative to bias said input transistor means on and said output transistor means off when the voltage of said voltage divider junction reaches a predetermined value sufficient to break down said PN junction in a forward direction, said voltage corresponding to an output voltage of said generator which is higher than said desired regulated voltage whereby said voltage divider assumes control of said voltage regulator, one of said impedances having a substantially higher resistance than the other impedance whereby the voltage at said voltage divider junction is reduced in magnitude as compared to the voltage of one of said field energizing terminals to prevent false triggering of said semiconductor by transient voltages.

2. The electrical system according to claim 1 where the resistance of said one impedance is approximately 30 times the resistance of the other impedance.

3. The electrical system according to claim 1 where the semiconductor device comprises a PN junction diode connected between said voltage divider junction and the base of said input transistor means, said PN junction diode conducting current in its forward direction between said junction and said base of said input transistor means when its forward conducting voltage is exceeded.

4. The electrical system according to claim 1 where said semiconductor comprises a transistor having a base connected with said voltage divider junction, a collector connected with the collector of said input transistor means and an emitter connected to the emitter of said input transistor means.

5. The electrical system according to claim 1 where said semiconductor comprises an NPN transistor having a base connected to said voltage divider junction, a collector connected to the collector of said input transistor means and an emitter connected to the vase of said input transistor means.

6. An electrical system comprising, a source of voltage including a generator having an output winding and a field winding, a field energizing circuit connected with said output winding, a field energizing circuit connected with said output winding including first and second field energizing terminals, a voltage regulator including an output transistor switching means and an input transistor switching means, said output transistor switching means including at least one transistor, said input transistor switching means comprising first and second transistors having a common collector connection with the emitter of said first transistor connected to the base of said second transistor, means connecting said output transistor switching means and said field winding in series across said field energizing terminals, means connecting the collector and emitter of said second transistor across the base and emitter of said output transistor switching means whereby said input transistor switching means controls the conduction of said output transistor switching means, means including a voltage reference device connected with the base of said first transistor and with said output winding for regulating the conduction of said output transistor switching means as a function of the output voltage of said generator to maintain a desired regulated output voltage from said generator, a semiconductor device including a PN junction, a voltage divider including first and second impedances connected across said field energizing terminals having a common junction, means connecting said PN junction and the base-emitter circuit of said second transistor between said junction and one of said field energizing terminals whereby said second transistor is biased conductive when the voltage at said junction reaches a predetermined magnitude which corresponds to an output voltage of said generator which is higher than said desired regulated value, said second impedance connected across said PN junction and the base-emitter circuit of said second transistor having a lower resistance than said first impedance whereby said voltage protection circuit is rendered less sensitive to transient voltages, one of said impedances comprising a temperature dependent resistance means responsive to the temperature of said voltage regulator and operative to vary the voltage between said junction and said one field energizing terminal to correlate this voltage with the changing temperature characteristics of said PN junction and the base-emitter junction of said second transistor.

7. An electrical system comprising, an alternating current generator having an output winding and a field winding, a power bridge rectifier having direct current output terminals connected with said generator, a plurality of auxiliary diodes connected with said output winding, said auxiliary diodes being connected with a third direct current output terminal, said third direct current output terminal and one direct current output terminal of said power bridge rectifier forming field energizing terminals, a voltage regulator including a transistor power output switching means and a transistor input switching means, said output transistor switching means including at least one transistor, said input transistor switching means comprising first and second transistors having a common collector connection with emitter of said first transistor connected to the base of the second transistor, means connecting the collector of said second transistor with the base of said output transistor switching means, means connecting said field winding of said generator and said output transistor switching means in series across said field energizing terminals, means connected with said direct current output terminals of said bridge rectifier and with the base of said first transistor for causing said output transistor switching means to control the field current for said generator as a function of the output voltage of said generator, said last named means operative to maintain the output voltage of said power bridge rectifier at a predetermined desired regulated value, a voltage divider connected across said field energizing terminals including first and second impedances having a common junction, and a semiconductor having a PN junction connected between said voltage divider junction and the base of said second transistor, said PN junction and the base-emitter circuit of said second transistor being forward biased to turn on said second transistor and turn off said output transistor switching means when the voltage at said junction of said voltage divider reaches a predetermined value which is indicative of an output voltage condition of said generator which exceeds said desired regulated value, at least one of said impedances of said voltage divider including a temperature dependent resistance, the impedance connected across said PN junction and the base-emitter circuit of said second transistor having a substantially lower resistance value than the other impedance whereby the voltage at the junction of said voltage divider is reduced in magnitude compared to the voltage at one of said field energizing terminals to prevent false triggering of said circuit including said forward biased PN junction and the base-emitter circuit of said second transistor by transient voltages.

8. A voltage regulator for regulating the output voltage of a generator comprising, a field current control means having a control electrode and a pair of current carrying electrodes, an input transistor means including at least one transistor, means connecting said input transistor means with the control electrode of said field current control means, the current carrying electrodes of said field current control means adapted to be connected in series with the field of a generator and with a field energizing circuit connected with the output winding of a generator, said voltage regulator having first and second terminals adapted to be connected with said field energizing circuit, a voltage divider comprised of first and second impedances connected across said first and second terminals, said voltage divider having a junction located between said first and second impedances, a voltage sensing circuit including a voltage reference device connected with the base of said input transistor means for controlling the conduction of said input transistor means as a function of the voltage applied to said voltage sensing circuit, said voltage sensing circuit adapted to be connected with said output winding of a generator to thereby regulate the field current of said generator as a function of the output voltage of said generator, a semiconductor device including a PN junction connected between said voltage divider junction and said second terminal, said PN junction of said semiconductor device connected with said input transistor means and operative by conduction in its forward direction to bias said input transistor means to a conductive condition to thereby turn off said field current control means whenever the voltage appearing between said first and second terminals exceeds a predetermined value which is higher than a desired regulated value to be maintained by said voltage regulator, said first impedance connected between said first terminal and said voltage divider junction having a substantially higher resistance than said second impedance whereby said voltage divider reduces the sensitivity of the circuit including said semiconductor to transient voltages appearing between said first and second terminals, one of said impedances of said voltage divider including temperature dependent variable resistance means which responds to the temperature of said voltage regulator and which provides for conduction of said PN junction in a forward direction at a predetermined voltage across said first and second terminals at varying temperatures of said voltage regulator.

9. The voltage regulator according to claim 8 where the semiconductor device is an NPN transistor having an emitter connected to the base of said input transistor means, a collector connected to the collector of said input transistor means and a base connected to said voltage divider junction.

10. The voltage regulator according to claim 8 where said semiconductor device comprises an NPN transistor having a base connected with said junction on said voltage divider, a collector connected to the collector of said input transistor means and an emitter connected to the emitter of said input transistor means.

11. An electrical system comprising, an alternating current generator having an output winding and a field winding, a full-wave power rectifier having direct current output terminals and AC input terminals connected to said output winding, a plurality of auxiliary diodes connected with said output winding and with a first field energizing terminal, one of said direct current output terminals of said power rectifier forming a second field energizing terminal, a transistor voltage regulator including a transistor output means and transistor input means, said transistor output means including at least one transistor, said transistor input means comprising first and second transistors having a common collector connection with the emitter of said first transistor connected to the base of said second transistor, means connecting the collector and emitter of said output transistor means in series with said field winding and across said field energizing terminals, means connecting the collector and emitter of said second transistor across the vase and emitter of said output transistor means, a voltage sensing circuit coupled to the base of said first transistor and including a Zener diode, means connecting said voltage sensing circuit with the output terminals of said power bridge rectifier whereby it responds to the direct output voltage of said power rectifier, a voltage divider comprised of first and second impedances connected in series across said field energizing terminals, and a semiconductor device comprising a third transistor having its base-emitter circuit connected between said voltage divider junction and the base of said second transistor, said second impedance connected across the base-emitter circuits of said third transistor and said second transistor, the collector of said third transistor connected with the collector of said second transistor, said first impedance having a substantially higher resistance than said second impedance whereby a reduced amplitude voltage appears at said voltage divider junction as compared to the voltage of one of said field energizing terminals, one of said impedances including a temperature sensitive variable resistance which responds to the temperature of said voltage regulator.

12. An electrical system comprising, an alternating current generator having a polyphase output winding and a field winding, a polyphase bridge rectifier connected with said output winding having direct current output terminals, said direct current output terminals being adapted to feed an electrical load, a plurality of auxiliary diodes connected with said output winding and a first field energizing terminal, one of said direct current output terminals of said power rectifier providing a second field energizing terminal, a transistor voltage regulator including a transistor output means and a transistor input means, said transistor output means including at least one transistor, said transistor input means comprising first and second transistors having a common collector connection with the emitter of said first transistor coupled to the base of said second transistor, means connecting the collector of said second transistor with the base of said output transistor means, a voltage sensing circuit for said voltage regulator connected with said direct current output terminals of said power rectifier, a Zener diode connected with the base of said first transistor and with said voltage sensing circuit for controlling the conduction of said output transistor means of said voltage regulator as a function of the output voltage developed by said generator, a voltage divider comprised of first and second impedances having a common junction connected across said field energizing terminals, and a voltage protecting control transistor having a base connected to said junction on said voltage divider and a collector connected to the collector of said second transistor, the emitter of said second transistor connected with the emitter of said control transistor, said second impedance connnected across the base-emitter circuit of said control transistor, said first impedance having a substantially higher resistance than said second impedance whereby the voltage at said junction is reduced in magnitude to provide a system wherein said voltage protecting control transistor has reduced sensitivity to transient voltages, one of said impedances including a temperature dependent resistance which responds to the temperature of said voltage regulator.